(12) United States Patent
Marheine

(10) Patent No.: US 8,061,529 B2
(45) Date of Patent: Nov. 22, 2011

(54) FILTER CARTRIDGE

(75) Inventor: Philip Charles Marheine, Rutherford (AU)

(73) Assignee: Filter Technology Australia Pty Ltd., Queensland (AU)

( * ) Notice: Subject to any disclaimer, the term of this patent is extended or adjusted under 35 U.S.C. 154(b) by 74 days.

(21) Appl. No.: 10/482,305

(22) PCT Filed: Jul. 3, 2002

(86) PCT No.: PCT/AU02/00879
§ 371 (c)(1),
(2), (4) Date: Dec. 30, 2003

(87) PCT Pub. No.: WO03/004128
PCT Pub. Date: Jan. 16, 2003

(65) Prior Publication Data
US 2004/0168970 A1    Sep. 2, 2004

(30) Foreign Application Priority Data
Jul. 3, 2001   (AU) ........................................ PR6091

(51) Int. Cl.
*B01D 27/06*   (2006.01)
*B01D 27/08*   (2006.01)
*B01D 35/30*   (2006.01)
*B01D 29/00*   (2006.01)
*B01D 29/50*   (2006.01)
*B01D 27/00*   (2006.01)
*B01D 35/00*   (2006.01)

(52) U.S. Cl. ............. 210/437; 210/167.01; 210/167.02; 210/435; 210/438; 210/439; 210/451; 210/455; 210/457; 210/484; 210/497.01

(58) Field of Classification Search .................. 210/314, 210/323.1, 323.2, 455, 435, 437, 438, 439, 210/483, 488, 489, 232
See application file for complete search history.

(56) References Cited

U.S. PATENT DOCUMENTS

| 4,115,277 A | * | 9/1978 | Swank ........................... 210/436 |
| 4,366,057 A | * | 12/1982 | Bridges et al. ................ 210/437 |
| 4,773,990 A | * | 9/1988 | Hood, Jr. ....................... 210/314 |
| 4,792,397 A | | 12/1988 | Rasmussen |

(Continued)

FOREIGN PATENT DOCUMENTS

AU    12391/95 B    5/1995

(Continued)

*Primary Examiner* — Nam X Nguyen
*Assistant Examiner* — Benjamin Kurtz
(74) *Attorney, Agent, or Firm* — Young & Thompson

(57) ABSTRACT

A filter cartridge (10), in this case comprising an injection moulded cylindrical plastics body (11) having spaced anti-tracking ribs (12) which are disposed unevenly along the inner surface (13) of the hollow body (11). First and second paper rolls as filter elements (14 and 15) have been pushed under compression into the hollow body (11) and are separated by spacer means (16) located centrally within the hollow body (11). Spacer means (16) is made from two separate spacers (18) which are generally made in the form of a spoked wheel type arrangement. Each spacer (18) comprises an outer ring (19) and an inner ring (20), the inner ring (20) has four apertures or recesses (21) on its top and offset by 45 degrees equally on its opposite side are four more equally spaced apertures (21) making a total of eight, the apertures provide flow through passages (21) through the inner ring (20), plastic connector portions (22) extend radially between the rings (19 and 20).

6 Claims, 2 Drawing Sheets

U.S. PATENT DOCUMENTS

| | | | | |
|---|---|---|---|---|
| 4,876,007 A | * | 10/1989 | Naruo et al. | 210/339 |
| 5,486,290 A | * | 1/1996 | McGinness et al. | 210/323.2 |
| 6,319,416 B2 | * | 11/2001 | Morgan et al. | 210/767 |
| 7,066,338 B1 | * | 6/2006 | Winter et al. | 210/455 |

FOREIGN PATENT DOCUMENTS

| | | | | |
|---|---|---|---|---|
| EP | 0556506 | | 8/1993 | |
| WO | WO 00/37232 | * | 6/2000 | 210/455 |

* cited by examiner

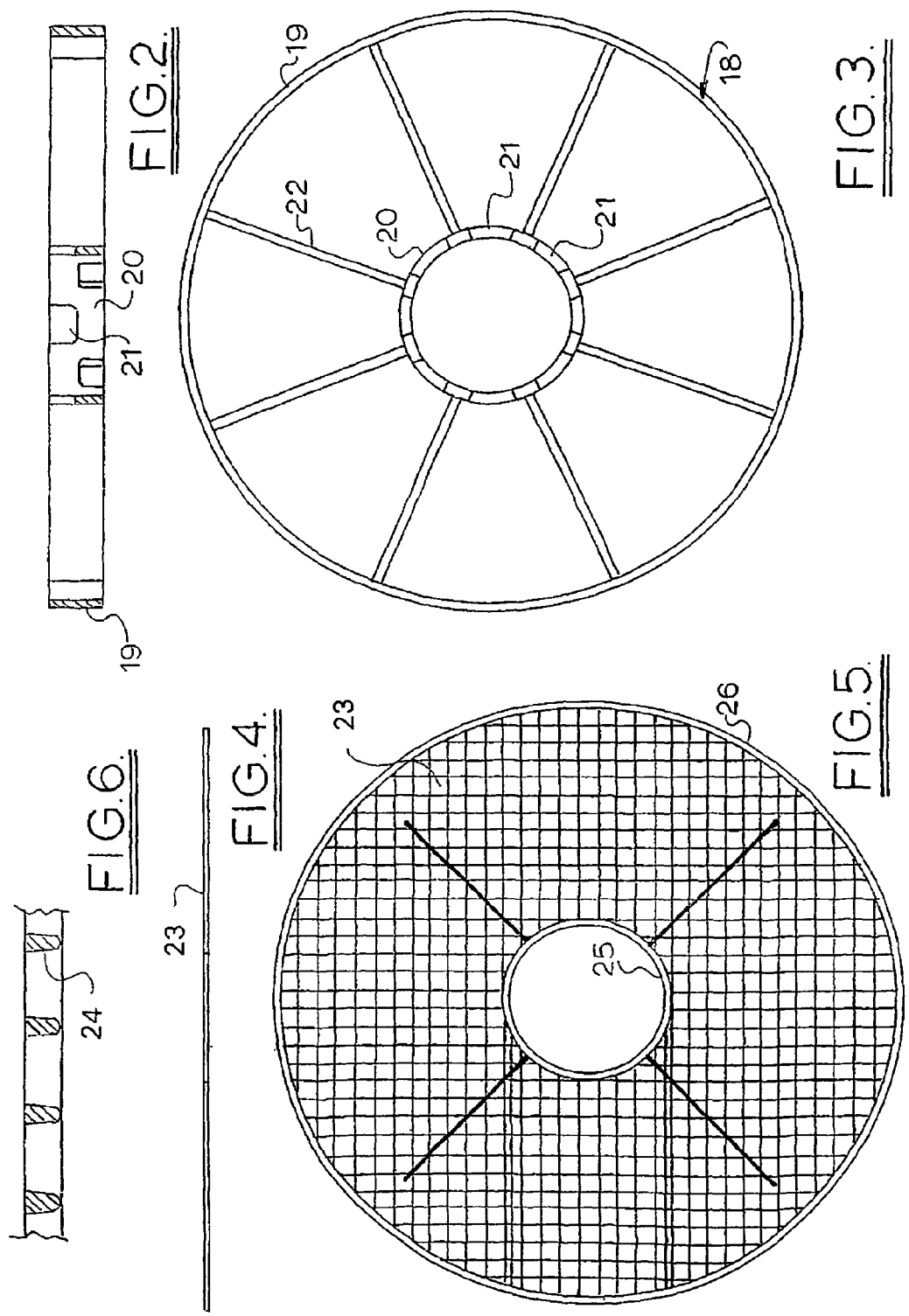

FILTER CARTRIDGE

TECHNICAL FIELD OF THE INVENTION

THIS INVENTION relates to a filter cartridge and in particular, but not limited to, a filter cartridge suitable for filtering oil or fuel.

BACKGROUND TO THE INVENTION

Filters are known that employ an outer filter body holding disposable filter cartridges, the outer body usually has a cylindrical housing and a cap, a coaxial return pipe usually has a threaded end and the cap screws onto the threaded end to clamp the cartridges in operative position in the housing. Liquid flows though an inlet, through filter media in the cartridges and out through the return pipe. Spent cartridges are simply exchanged with new ones. Typical cartridges are known that are made from a paper roll held in a plastics or metal cylinder. An example is described in WO/0037232. There are various alternative constructions and flow modalities used.

European patent application No. P 0 556 506A1 describes a modular filter system consisting of cartridges made from a tightly wrapped paper filter media retained in a plastic casing. The plastic casing has integrally formed grate-like configuration on its top and bottom surfaces to allow fluid to enter an exit the filter. The casing is also dimensioned to closely surround the paper media. The filter cartridges are stackable within the filter housing which can retain a plurality of cartridges thereby increasing the capacity of the filter. Each casing is made from identical top and bottom halves where the cylindrical walls clip together around the paper roll. When two cartridges are used the grid like top of one cartridge a butts the grid-like bottom of the other so that liquid flows from one cartridge to the next in series. Thus liquid flows one way, from one end only and is recovered out the other end. The central pipe in this case is an inlet pipe rather than a return pipe.

Other arrangements are known where liquid flows simultaneously into the filter in opposite directions and is recovered centrally, see for example Australian Patent 729523 and U.S. Pat. No. 4,792,397.

Australian Patent 729523 and WO/0037232 describe an injection moulded filter cartridge filled with a paper roll filter media. Unlike the cartridge of European patent application No. P 0 556 506A1, the cartridge is open ended and does not employ grate-like ends. This allows a press to be used to insert paper rolls under pressure. In one cartridge opposite ends of the cartridge are completely open so the cartridge is effectively a tube with two back-to-back paper rolls separated by gauze providing a return flow path. The paper rolls have a central bore made of cardboard for a return pipe. Thus when the cartridge is clamped inside a filter container liquid flows from an inlet in the container in both ends of the cartridge, through the paper rolls and is recovered by flowing out the ends of the paper rolls through a common return path formed by the gauze to the central return pipe. The gauze separates the confronting ends of the rolls and provides a flow path for the filtered liquid. Gauze is also used in the arrangement of Australian patent 659793 to separate two paper rolls in a metal cannister.

In U.S. Pat. No. 4,792,397 back-to-back paper rolls are used in a similar arrangement Australian Patent 729523 and WO/0037232 except instead of gauze being used to separate the rolls U.S. Pat. No. 4,792,397 uses a specially made fluid collector between the rolls. The fluid collector has closely spaced concentric ridges projecting from opposite sides of a substantially flat portion, pressure equalisation holes pass through the flat portion. The ridges push into the paper rolls on opposite sides of the collectors. Gaps in each ridge allows radial return flow to the central return pipe.

In Australian patent 650176 a metal canister is provided with end wall depressions to improve radial return flow. In Australian patent application 59243/00 a fluid collector is provided in an end wall of the housing, the fluid collector has lands in the form of sectors of a circle separated by radial flow passages.

The prevailing design criteria adopted in all these instances is to support the paper across its ends in an effort to maintain the return flow and minimise blockages that might impede flow as the paper collapses. Since the filters are pressurised as the filter media ages and becomes loaded it may distort in the region of the return flow leading to blockages. The gauze may become depressed by the paper being forced across the gap. Thus in the above examples it is usual to provide a substantial amount of support at the end of the paper roll with fluid collectors with relatively large flow paths being preferred to wire gauze.

The present invention adopts a completely different approach to the problem of supporting the roll while maintaining greater efficiency of return flow across the filter.

OUTLINE OF THE INVENTION

In one aspect there is provided filter cartridge having a hollow outer body, a filter element having an inlet end and an outlet end and being held in the outer body and there being a return flow passage adjacent the outlet end, spacer means defining the return flow passage, characterised in that the spacer means comprises an axially extending screen support member and a screen supported on the screen support member, the screen being disposed between the filter element and the screen support member for flow of filtrate though the screen into the return flow passage.

Preferably, the hollow outer body has openings at each end, a pair of said filter elements being held in longitudinally spaced relation in the outer body, said spacer means being disposed between the respective filter elements, the spacer means having opposite longitudinally spaced apart screen supports, and a respective said screen being supported on said spaced apart screen supports, each screen being disposed between a respective filter element and the screen support for flow of filtrate though the screens into the return flow passage.

Preferably, the spacer means comprises radially spaced inner and outer ring members held apart by circumferentially spaced radially extending vanes connecting the ring members together, the vanes extending longitudinally and having opposite edges forming open sectors between the vanes, the edges of the vanes being said screen support and providing the return flow passage between the vanes, the inner ring having flow through passage means communicating with the return flow passage.

Preferably, the spacer means comprises two separate spacer means with circumferentially offset sets of vanes.

Preferably, the spacer means is wheel-like having a central hub and an outer rim connected by circumferentially spaced radial spoke means, the central hub having flow through passage means enabling flow of filtrate from a region adjacent the radial spoke means to a central passage means in the hub. Preferably, the spacer means comprises two identical spacers slid into the hollow body and located centrally between longitudinally spaced circumferentially extending anti-tracking ribs in an inner wall of the hollow body.

Preferably, the filter elements are paper rolls and the hollow body includes spaced ribs projecting from an inner wall thereof and impinging upon the filter elements.

BRIEF DESCRIPTION OF THE DRAWINGS

In order that the present invention can be more readily understood and be put into practical effect, reference will now be made to the accompanying drawings which illustrate a preferred embodiment of the invention and wherein:

FIGS. 2 and 3 are respective section and plan views of a typical spacer two such spacers being employed in the FIG. 1 embodiment;

FIGS. 4 and 5 are respective side and plan views of a mesh screen suitable for use with the spacer of FIGS. 2 and 3; and FIG. 6 is a part section showing the structure of the mesh screen of FIGS. 4 and 5.

METHOD OF PERFORMANCE

Figure 1:
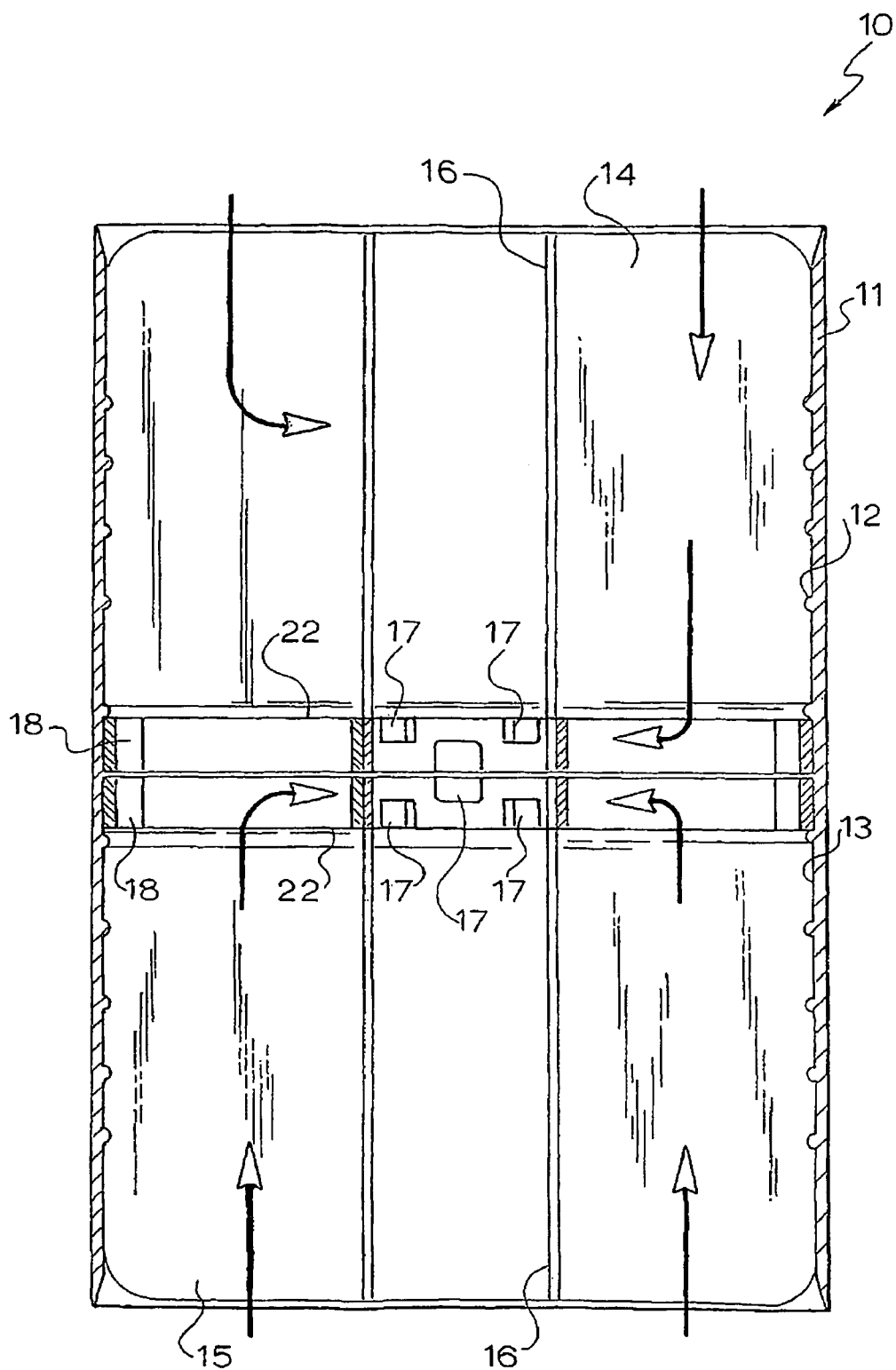
FIG. 1 is a longitudinal section through a filter element according to the present invention, the filter element being cylindrical in transverse cross section.

Referring to the drawings and initially to FIG. 1 there is illustrated a filter cartridge 10, in this case comprising an injection moulded cylindrical plastics body 11 having spaced anti-tracking ribs 12 which are disposed unevenly along the inner surface 13 of the hollow body 11. First and second paper rolls as filter elements 14 and 15 having central cylindrical cores 16 have been pushed under compression into the hollow body 11 and are separated by spacer means made from two separate spacers 18 located centrally within the hollow body 11.

Each of the paper rolls 14 and 15 include the central cylindrical core 16 so that a return pipe (not shown) can be inserted through the cartridge when the cartridge is clamped within a housing (not shown). Fluid flows in the direction of the arrows through the filters back and radially through the spacers 18 and flow through passages 17 so that filtrate travels to the return pipe (not shown). In the illustrated embodiment the spacer means is made from two separate spacers 18, which are generally made in the form of a spoked wheel type arrangement as illustrated in FIGS. 2 and 3, used because a single spacer of the same size would be too rigid to be inserted due to the ribs 12.

Referring to FIGS. 2 and 3 each spacer 18 comprises an outer ring 19 and an inner ring 20, the inner ring 20 has four apertures or recesses 21 on its top and offset by 45 degrees equally on its opposite side are four more equally spaced apertures 21 making a total of eight, when the spacers a put together inside the hollow body 11 the apertures 21 provide the flow through passages 17 through the inner rings 20, while plastic connector portions in the form of spokes 22 extend radially between the rings 19 and 20.

Since the outer body 11 is made from a relatively rigid plastics material as are the spacers 18, the dimensions of the spacers 18 are selected so that the spacers 18 can be pushed into position over the ridges 12.

Mesh screens 23 are placed in position atop the spacers 18 prior to insertion of the paper filter elements 14 and 15.

Preferred mesh screens are illustrated in FIGS. 4, 5 and 6, the mesh screens include tapered screen elements 24. The mesh screen is, in this embodiment, preferably injection moulded and formed with marginal edge sections 25 adjacent the central opening and outer peripheral marginal edge sections 26 formed so as to inhibit any fraying that might result in portions of the mesh screen being dislodged into the filtrate. Thus filtrate flows through the mesh screens 23, between the spokes 22 and through the flow through passages 17.

Whilst the above has been given by way of illustrative example of the present invention many variations and modifications thereto will be apparent to those skilled in the art without departing from the broad ambit and scope of the invention as set out in the appended claims.

The invention claimed is:
1. A filter cartridge comprising:
a rigid hollow moulded outer body; and
a filter element comprising a paper roll having an axial core having a central axis and an outer periphery having an inlet end and an outlet end and being held in the outer body such that liquid passes axially through the paper roll and radially through a spacer means adjacent the outlet end, the spacer means defining part of a return flow passage, wherein the hollow outer body has an open inlet end and a continuous axially extending cylindrical side wall having an inside diameter and surrounding the outer periphery of the paper roll, the hollow outer body having ribs projecting inwardly from the cylindrical side wall, the spacer means comprises an axially extending screen support member and a screen supported on the screen support member, the screen comprising a flat apertured disc having a grid of apertures between an inner ring and an outer ring, the inner ring and the outer ring comprising non-apertured annular margins of the screen and being disposed between the filter element and the screen support member with the filter element positioned on the screen for flow of filtrate from the filter element through the screen into the spacer means, the screen support extending radially from the axial core and comprising an outer ring and an inner ring adjacent the axial core and being segmented by circumferentially spaced radial connectors extending between the inner ring and the outer ring and having spaces between the connectors, the screen being seated on the connectors, the inner ring having apertures communicating with the axial core, and the return flow passage comprising the screen, the spaces between the connectors and the apertures in the inner ring, the outer ring having an outside diameter approximately equal to the inside diameter of the side wall, and the outer ring of the screen having an outside diameter approximately equal to the outside diameter of the outer ring of the screen support member so that the respective inner and outer rings of the screen and the screen support member overlap.

2. The filter cartridge according to claim 1 wherein the hollow outer body has openings at each end, a pair of filter elements being held in longitudinally spaced relation in the outer body, said spacer means being disposed between the respective filter elements, the spacer means having opposite longitudinally spaced apart screen supports, and a respective said screen being supported on said spaced apart screen supports, each screen being disposed between a respective filter element and the screen support for flow of filtrate through the screens into the return flow passage, the outer ring of the screen support extending axially along the side wall and being held in operative position between two of said ribs.

3. The filter cartridge according to claim 1 wherein the connectors comprise circumferentially spaced radially extending vanes connecting the rings of the screen support member together, the vanes extending longitudinally and having opposite edges forming said spaces as open sectors between the vanes, the edges of the vanes being said screen support along with the inner and outer rings of the screen support member.

4. The filter cartridge according to claim 1 wherein the spacer means comprises two separate spacer means with respective said connectors comprising circumferentially offset sets of vanes.

5. A filter cartridge having a cylindrical hollow outer body having a inner wall with a centrally located pair of longitudinally spaced circumferentially extending anti-tracking ribs, a cylindrical filter element having an inlet end and an outlet end and being held in the outer body and there being a return flow passage adjacent the outlet end, spacer means defining the return flow passage, wherein the spacer means comprises an axially extending screen support member and a screen supported on the screen support member, the filter element, the screen support member and the screen being of approximately equal diameter and the screen having a grid of apertures being disposed between the filter element and the screen support member for flow of filtrate through the screen into the return flow passage wherein the spacer means comprises two identical spacers slid into the hollow body and located centrally between longitudinally spaced circumferentially extending anti-tracking ribs in an inner wall of the hollow body.

6. A filter cartridge having a hollow moulded rigid outer body, a filter element having an inlet end and an outlet end and being held in the outer body and there being a return flow passage adjacent the outlet end, spacer means defining the return flow passage, wherein the hollow body has a cylindrical side wall with longitudinally spaced circumferential extending anti-tracking ribs, and the spacer means comprises an axially extending screen support member and a screen having a grid of apertures supported on the screen support member, the screen having an outer ring and an inner ring, the inner ring and the outer ring comprising non-apertured annular margins of the screen and being disposed between the filter element and the screen support member for flow of filtrate through the screen into the return flow passage wherein the spacer means comprises two spacers slid into the hollow body over the ribs and being located centrally between the longitudinally spaced circumferentially extending anti-tracking ribs, each spacer means comprises radially spaced inner and outer ring members held apart by circumferentially spaced radially extending vanes connecting the ring members together, the vanes extending longitudinally and having opposite edges forming open sectors between the vanes, the edges of the vanes being said screen support and providing the return flow passage between the vanes, the inner ring having apertures communicating with the return flow passage.

* * * * *